United States Patent
So et al.

(10) Patent No.: US 11,689,961 B2
(45) Date of Patent: *Jun. 27, 2023

(54) SYSTEMS AND METHODS FOR DISTRIBUTION OF APPLICATION LOGIC IN DIGITAL NETWORKS

(71) Applicant: Microsoft Technology Licensing, LLC, Redmond, WA (US)

(72) Inventors: Steven Rhejohn Barlin So, Billerica, MA (US); Philip To, Lexington, MA (US); Anand Krishnamurthy, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,995

(22) Filed: Nov. 22, 2021

(65) Prior Publication Data
US 2022/0182874 A1    Jun. 9, 2022

Related U.S. Application Data

(62) Division of application No. 16/879,012, filed on May 20, 2020, now Pat. No. 11,184,794.
(Continued)

(51) Int. Cl.
| | |
|---|---|
| *G06F 15/173* | (2006.01) |
| *H04W 28/02* | (2009.01) |
| *H04L 41/16* | (2022.01) |
| *H04L 41/5025* | (2022.01) |
| *H04L 43/0817* | (2022.01) |

(Continued)

(52) U.S. Cl.
CPC ........ *H04W 28/0268* (2013.01); *H04L 41/16* (2013.01); *H04L 41/5025* (2013.01); *H04L 43/0817* (2013.01); *H04L 67/02* (2013.01); *H04L 67/10* (2013.01); *H04L 67/34* (2013.01); *H04W 48/16* (2013.01)

(58) Field of Classification Search
CPC .. H04W 28/0268; H04W 48/16; H04L 41/16; H04L 41/5025; H04L 43/0817; H04L 67/02; H04L 67/10; H04L 67/34
See application file for complete search history.

(56) References Cited

U.S. PATENT DOCUMENTS

2008/0313109 A1* 12/2008 Machulsky ........... G06F 3/0671
703/21
2013/0254258 A1*  9/2013 Agarwalla ................ H04L 9/40
709/202
(Continued)

*Primary Examiner* — Padma Mundur
(74) *Attorney, Agent, or Firm* — Ray Quinney & Nebeker P.C; James Bullough (57) ABSTRACT

Techniques for distribution of application logic in digital networks are disclosed. In one embodiment, the techniques may be realized as a method that includes receiving a request from a first device to initiate a service instance associated with a service. The service instance is associated with application logic. The method further includes determining one or more parameters associated with the request, identifying at least a portion of the application logic to distribute to a mobile edge server based on the one or more parameters, and distributing the at least a portion of the application logic to the mobile edge server to cause the mobile edge server to provide the service instance to the first device.

20 Claims, 4 Drawing Sheets

Related U.S. Application Data

(60) Provisional application No. 62/851,356, filed on May 22, 2019.

(51) Int. Cl.
*H04L 67/02* (2022.01)
*H04L 67/10* (2022.01)
*H04L 67/00* (2022.01)
*H04W 48/16* (2009.01)

(56) References Cited

U.S. PATENT DOCUMENTS

2015/0066929 A1\* 3/2015 Satzke ................... G06N 20/10
    706/12
2020/0027033 A1\* 1/2020 Garg ....................... G06F 17/18

\* cited by examiner

FIG. 4

SYSTEMS AND METHODS FOR DISTRIBUTION OF APPLICATION LOGIC IN DIGITAL NETWORKS

RELATED APPLICATIONS

This application is a divisional of U.S. patent application Ser. No. 16/879,012 (the '012 Application) filed on May 20, 2020. The '012 Application claims priority to U.S. Provisional Patent Application No. 62/851,356, filed May 22, 2019. The aforementioned are incorporated by reference herein in their entirety.

FIELD OF THE DISCLOSURE

The present disclosure generally relates to digital networks and, more particularly, to distribution of application logic in digital networks.

BACKGROUND

In present iterations and the next generation of digital mobile networks, network functions are distributed between a control plane and user plane separation ("CUPS") architecture such that scaling of network resources can occur at different rates in the control plane and user plane, respectively. Given the increasing usage demands of consumers, operators may scale user plane functionality without investing in improvements in control plane hardware, thereby decreasing operating costs.

Mobile edge computing ("MEC") in digital networks allows network operators to distribute computational functions that would traditionally be completed at core network nodes. Distributing these operations away from the core network allows operators to decrease the computational resources used by the core network instead performing processing functions at smaller, distributed nodes closer to user equipment ("UE"). Additionally, because network traffic is not travelling to the core network, MEC nodes decrease latency in performing these operations, resulting in better user experience.

Determining which network operations to distribute to MEC nodes can be a costly and time-consuming process, requiring operators to evaluate numerous factors of usage data and user profiles. Accordingly, it is desirable to develop improved techniques and systems for selecting distributed functions to be sent to MEC nodes. This background is for purposes of providing context of the given systems and methods and is not intended to define the scope or nature of any prior art to the present disclosure.

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Due to advancements in control plane and user plane separation ("CUPS") architecture, digital network operators have the ability to improve user plane functionality by investing in increased capabilities while maintaining control plane hardware and functions. CUPS architecture allows separation of key network nodes to enable flexible network deployment and operation, as described in 3GPP Standard TS 23.214. The CUPS architecture, therefore, facilitates independent scaling of user plane elements and control plane elements to account for increased user activity, either in the form of increased data traffic or increased number of user equipment ("UE"). An additional benefit of the CUPS architecture is that operators may "push" user plane functions (also referred to as "offloading") to the network edge and reduce latency of network traffic by locally breaking out network functions. Operators do this by moving operational functions closer to UE that relies on the network data paths so that data need not be aggregated at centralized core network servers before going to the Internet.

Proposals to utilize mobile edge computing ("MEC") have recently begun to take precedent in the search for efficient methods to improve network function. MEC enables specific applications or programming logic to be pushed to closer to the end user at the network edge to reduce latency, improve user experience, and to incur less cost caused by transporting data traffic to the core network routers. Within the user plane, MEC allows for certain logic/applications to be executed outside of the core network and closer to client devices, thereby improving key performance indicators ("KPIs") such as latency and network congestion. Additionally, MEC enables local breakout at the network edge, allowing roaming mobile users to connect to alternative service providers instead of requiring that the user's data traffic be hauled back to their home core network.

MEC is made possible by providing individual distributed servers (e.g., MEC servers) at strategic physical locations to serve users efficiently and decrease costs for operators. This results in improved application performance and faster data speeds as well as efficient deployment of existing network infrastructure without requiring costly investment for full end-to-end network improvements on behalf of the operator. Typically, an MEC server has much less computing power than the core network routers and servers since space and power are at a premium at the local exchange offices. Therefore, only a limited number of users or application functions may be moved to the network edge to MEC servers. Network operators presently determine such distribution to network edge nodes using iterative methods, such as caching application contents or operations which requiring manual reconfiguration that is time consuming, costly, and data intensive, while also prone to human error.

Accordingly, the present disclosure describes systems and methods by which automated intelligent computation can dynamically offload entire users or specific application to network edge nodes, such as MEC servers, for optimal network resource allocation. Embodiments of the present disclosure allow operators to maximize the benefits of employed MEC servers and simultaneously minimize operating cost. There is currently no intelligent system that focuses on user-centric needs and synchronizes these needs to improve the functionality or function distribution between the user plane and control plane. Without this intelligent system, it is hard to guarantee that the cost, resource allocation, and user-experience is optimized.

Figure 1:
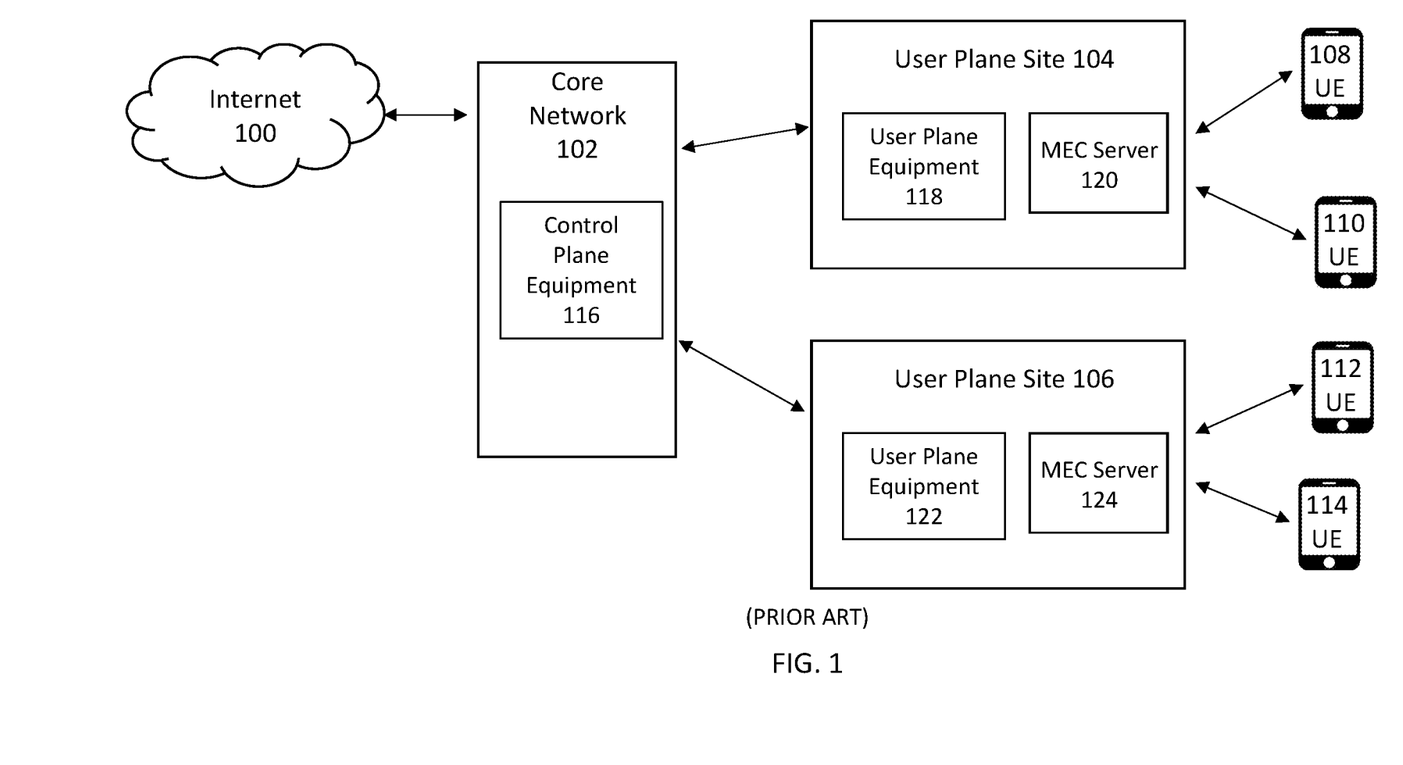
FIG. 1 is a simplified diagram of prior art network architecture employing separate control plane and user plane functionality at distributed locations using mobile edge computing.

FIG. 1 is a simplified diagram of prior art network architecture employing separate control plane and user plane functionality at distributed locations using mobile edge computing. FIG. 1 shows internet 100, a core network 102, user plane sites 104, 106, and multiple UEs 108-114. Using traditional CUPS architecture, core network 102 includes control plane equipment 116 capable of executing control plane functions. User plane site 104 includes user plane equipment 118 and mobile edge computing ("MEC") server 120. Similarly, user plane site 106 includes user plane equipment 122 and MEC server 124. User plane equipment 118, 122 is capable of executing user plane functions. MEC servers 120, 124 execute certain computation or data processing that would otherwise be done at internet 100. MEC servers 120, 124 allow for faster data processing because computations are completed closer to the users.

For example, as shown in FIG. 1, UEs 108 and 110 are serviced at user plane site 104, such that all user plane functions associated with UEs 108, 110 are completed by user plane equipment 118. MEC server 120 can complete data processing for packets received from UEs 108, 110 as defined by rules set by an operator at core network 102. Data packets received by user plane site 104 that are not directed to MEC server 120 by user plane equipment 118 will travel through core network 102 for processing at internet 100. Similarly, UEs 112,114 are shown in FIG. 1 as being serviced by user plane site 106.

Control plane equipment 116 may assign UEs 108-114 to user plane sites 104, 106 and whether specific functions or application logic are to be performed at MEC servers 120, 124. However, MEC servers 120, 124 may have limited computing capacity. Limitations of MEC servers 120, 124 may include minimal computational power due to equipment data traffic capacity, operator decisions to serve only specific types of UEs through specific MEC servers, physical proximity limitations to RAN or backhaul network equipment.

MEC servers 104-106 can include a number of server designs including small cell cloud ("SCC"), mobile micro clouds ("MCC"), fast moving personal cloud ("MobiScud"), Follow me cloud ("FMC"), and concept converging cloud and cellular systems ("CONCERT"). UEs 108-114 can include a mobile phone, laptop computer, desktop computer, tablet, personal data assistant, smart watch, electronic appliance, or other network operative devices.

Figure 2:
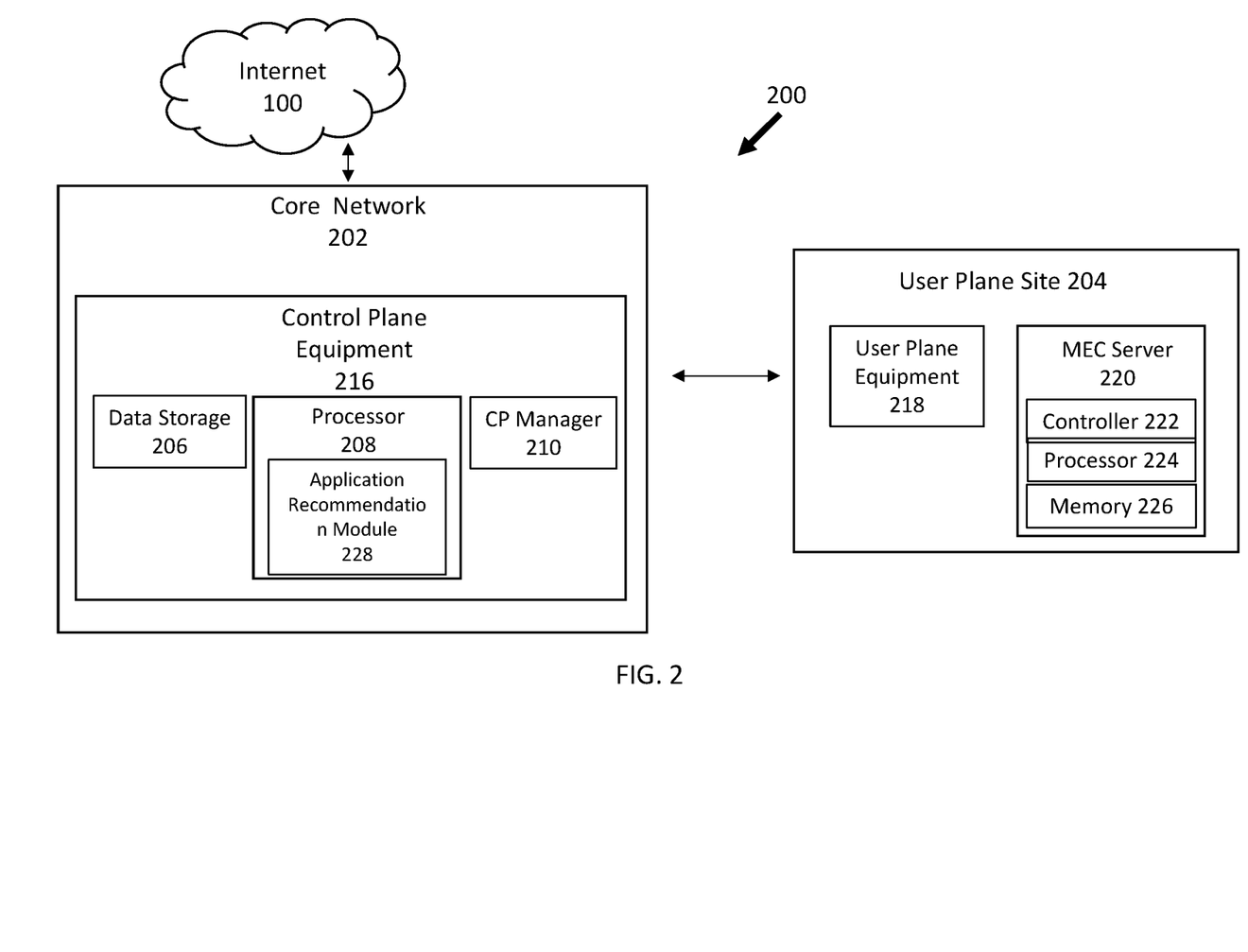
FIG. 2 is a simplified diagram of a system for intelligently and dynamically distributing application function to an edge computing mode, according to an embodiment of the present disclosure.

FIG. 2 is a simplified diagram of a system for intelligently and dynamically distributing application function to an edge computing mode, according to some embodiments of the present disclosure. FIG. 2 shows network system 200 including internet 100, a core network 202, and a user plane site 204. For purposes of explanation, only a single user plane site 204 is shown, however, multiple user plane sites may be employed in embodiments of an end-to-end network using the present system. User plane site 204 is configured to service multiple UEs (not shown). Core network 202 contains control plane equipment 216 including data storage 206, processor 208, and control plane manager 210. Control plane equipment 216 may communicate with user plane site 204 via user plane equipment 218 by utilizing CUPS architecture protocols as described as part of the packet forwarding control protocol ("PFCP").

User plane site 204 includes user plane equipment 218 and MEC server 220, which contains a controller 222, a processor 224, and a memory 226. User plane equipment 218 may include physical network nodes such as a packet data network gateway ("PGW"), serving gateway ("SGW"), evolved node B ("enodeB"), or other equipment capable of performing user plane functions. Examples of services carried out by user plane equipment may include Quality of Service (QoS) treatment, charging, shallow and deep packet inspection, traffic throttling, TCP optimization, among others. In some non-limiting embodiments of MEC server 220, controller 222 is capable of responding to data and operational requests (also referred to herein as a "service") received at user plane equipment 218 from UEs. Controller 222 may be capable of executing user plane functions including those carried out by physical nodes such as that of a user plane service gateway ("SGW-U") or a user plane PDN gateway ("PGW-U"). In some embodiments, controller 222, and corresponding controllers in MEC server 220 may be a small cell manager, a MobiScud controller, or an FMC controller. In other embodiments, controller 222 may be a control-plane resident application function, for example, by virtualizing the equipment and functions of MEC server 220. Similarly, processor 224 may be comprised of specific nodes for carrying out user plane functions such as physical nodes of SGW, PGW, and evolved node B ("enodeB"). Memory 226 may cache specific service functions (e.g., application logic) executed at MEC server 220 such that those same operations may be recalled for later service requests. In some embodiments, MEC server 220 may be one of multiple, physically-distributed data centers or servers that host interoperable virtual machines ("VMs") based on a location of user equipment. In some embodiments, distributing network traffic in the user plane site 204 may require intelligence (e.g. separate equipment logic) to decide which data processing to distribute between user plane site 204 and internet 100. In some embodiments, MEC server 220 can also be used in an enterprise customer setting, so that all traffic belonging to an enterprise will be subjected to application logic on MEC server 220 assigned to that enterprise such as security functions, data backup, or other enterprise-specific operations.

In some embodiments, user plane equipment 218 may communicate directly with internet 100. User plane equipment 218 may direct network traffic received from a UE (not shown) to internet 100 as part of a local breakout procedure when UE is seeking service outside of the core network 202 associated with the specific UE. In some embodiments, user traffic with destinations in relative proximity to the originating UE may only require handling using user plane sites, such as user plane site 204, such that data traffic does not need to be processed at internet 100. In such cases, user traffic may be distributed for processing only at local user plane sites, or a local router, without hauling data traffic to internet 100. Local breakout may allow for operators to limit bandwidth requirements, data processing requirements, and latency in network processing, among others.

Within control plane equipment 216, data storage 206, processor 208, and control plane manager ("CP manager") 210 perform control plane operations for the end-to-end network in addition to equipment identified by PFCP. In some embodiments, data storage 206 is a memory containing information about computation and application operation (also referred to herein as "usage parameters") including application functions performed for specific users, usage data by volume, frequency of application use, frequency of application functions used, quality of service (QoS) terms, historic network latency associated with applications, user membership profiles, user data, application data, network traffic statistics, KPIs, or other forms of user-specific data. Data storage 206 may also contain logs of user plane equipment functions beyond application functions such as overall data throughput between core network 202 and internet 100, user plane site 204 to core network 202, and user plane equipment 218 to MEC server 202, among others. Data storage 206 may store relevant data in containers or sub-containers that make use of data stored in data storage 206 more efficient for operators to employ for analysis. In some embodiments, data storage 206 may include neural networks to determine how to organize usage data (e.g. allocate weights or hierarchy to stored usage data).

Processor 208 includes an application recommendation module 228. Application recommendation module 228 processes data received from data storage 206 to identify optimum application functions to be carried out at either of internet 100 or MEC server 220. Application recommendation module 228 may include a simulation system (not shown) for purposes of training a machine learning algorithm to be deployed within application recommendation module 228. The process by which application recommendation module 228 trains and employs machine learning algorithms to generate optimized application function distribution between internet 100 and MEC server 220 is further described below with respect to FIGS. 3 and 4. CP manager 210 determines whether to assign a specific UE to user plane site 204 for service, or whether that specific UE would be better serviced at other user plane sites that are part of the end-to-end network. In some embodiments, CP manager communicates with user plane site 204, and specifically user plane equipment 218, after receiving output of the application recommendation module 228. In other embodiments, CP manager 210 may dynamically change the selected user plane site 204 for a particular UE in response to changing conditions of the service instance, such as a change in network data traffic or UE location. In some embodiments, CP manager 210 may identify the location of UEs to instantiate a service at MEC server 220 that is physically proximate to a user based on limitations of RAN or backhaul network equipment. In other embodiments, CP manager 210 may select MEC server 220, or other MEC servers, based on VMs currently deployed across user plane sites in the network, which may or may not be in close physical proximity to a user. In determining whether to provide service to a UE via a physically proximate or computationally proximate MEC server 220, CP manager 210 may account for parameters including, for example, data traffic throughput of user plane site 204, type of device, type of application logic to be performed, time of day, user membership identifiers (e.g. premium user tiers), quality of service (QoS), computational capacity at processor 224, or latency requirements for the requested application, among others.

Figure 3:
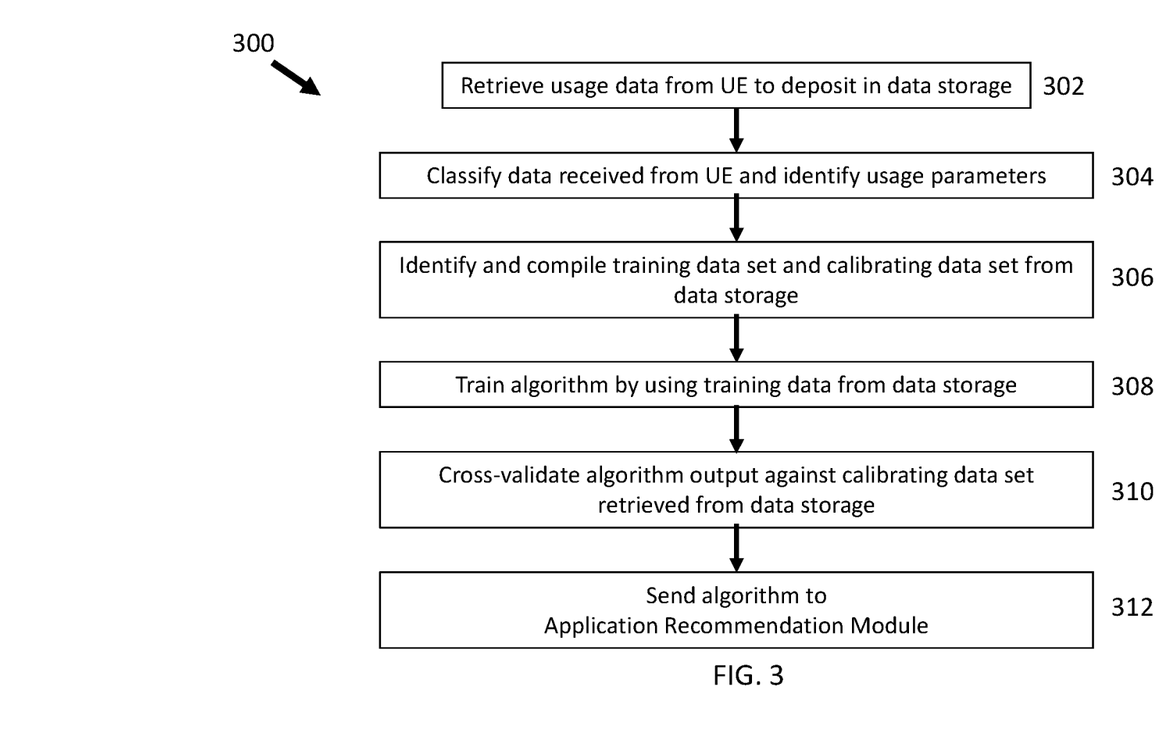
FIG. 3 is a simplified flow diagram of a process to train an application recommendation module, according to an embodiment of the present disclosure.

FIG. 3 is a simplified flow diagram of a process 300 to train an algorithm within application recommendation module 228, according to an embodiment of the present disclosure. For example, application recommendation module 228 may include algorithms such as content-based and collaborative-filtering methods. For example, such methods may include user-based K-Nearest-Neighbors, Matrix Factorization, Deep neural networks (e.g., convolutional neural networks), among others. At step 302, control plane equipment 216 receives usage data reported from UEs in the network that is deposited in data storage 206. At step 304, all data received from UEs is classified/parsed into usage parameters. The usage parameters may be defined by an operator (e.g. by a subject-matter expert ("SATE")) such as application type; network data throughput; data use by specific applications; frequency of application use; membership tier of a user including billing terms, QoS terms, latency demands; latency requirements associated with an application; MEC function capacity, MEC function tailoring; computational demand for application functions; geographic location; compatibility of co-executed applications; time of day; energy use of the MEC server, capacity of MEC server processor or memory, Access Point Name (APN), destination URL of the application, historic usage patterns, historic UE behavior, day of the week, date of the year, current system utilization, and a number of UE's requiring the same application in the vicinity, among others that may be correlated or identified either by operators or the machine learning algorithm itself.

In some embodiments, the usage parameters may be updated by output from application recommendation module 228, described in detail below with respect to FIG. 4, such that data storage 206 contains parametric connections within data that are not previously recognized by an SME. At step 306, the system identifies and compiles a training data set and a calibrating data set from the data within data storage 206. In some embodiments, the training data set may be a large portion of data within data storage 206 over a set period of time as compared to the calibrating data set. The calibrating data set and training data set may be taken from the same data source but divided into subsets of the same data set to provide accurate comparison between the data points for purposes of training. For example, if the data set in data storage 206 represents data taken over a 48-hour period, training data set may comprise all data taken during the first thirty-six hours of the time period where the calibrating data set may only comprise the data taken during the last twelve hours of the time period. Having consistent training and calibrating data sets allow an operator to ensure the accurate performance of application recommendation module 228.

At step 308, control plane equipment 216 trains the algorithm of application recommendation module 228 by using the training data from data storage 206. To do so, the training data set is systematically input into simulation environments whereby an SME may identify critical parameters and associated weights within the algorithm of application recommendation module 228. In some embodiments, the SME may utilize subsets of the training data set to identify critical parameters for the algorithm and compare algorithm performance on each subset of the training data set before proceeding with larger portions of the training data set for purposes of training. For example, if the training data set represents data collected during the first thirty-six hours of a given time period, SME may begin to train the algorithm using subsets of data received every thirty minutes to identify discrete variables that are part of the subset. Once the algorithm is properly corrected to account for the variables in that first thirty-minute subset, SME may apply the algorithm to the next thirty-minute segment of data and identify any previously-unaccounted for variables that need to be part of the algorithm. In some embodiments, this type of iterative process allows for SME to ensure that the algorithm of application recommendation module 228 is prepared to account for previously unknown variables. As part of this process, SME may also provide nonce variables in the algorithm such that application recommendation module 228 may account for new variables as it encounters them without interaction from SME or other operators. In some embodiments, processor 208 is also configured to identify critical parameters and associated weights by receiving usage data and passes it through the algorithm. The algorithm then produces a recommendation of where certain user plane functions should be allocated between the user plane equipment and the internet.

At step 310, the algorithm is applied to the calibrating data set in a simulated environment to confirm proper training as described above in step 308. Using the calibrating data set, an operator has the ability to know the value of each parameter identified within the data set but will introduce only a subset of those parameters into the algorithm. Upon operation and output from the algorithm, an operator can compare the computed output to the calibrating data set to determine if the algorithm is properly identifying the parameters and their expected values for the systems operation. In some embodiments, the calibrating data set may be used in subsets similar to the process by which the training data set may be used, as described above. At step 312, after sufficient testing, processor 224 sends the algorithm from the simulation environment and to the application recommendation module 228 (e.g., sent to the "real-time system").

Figure 4:
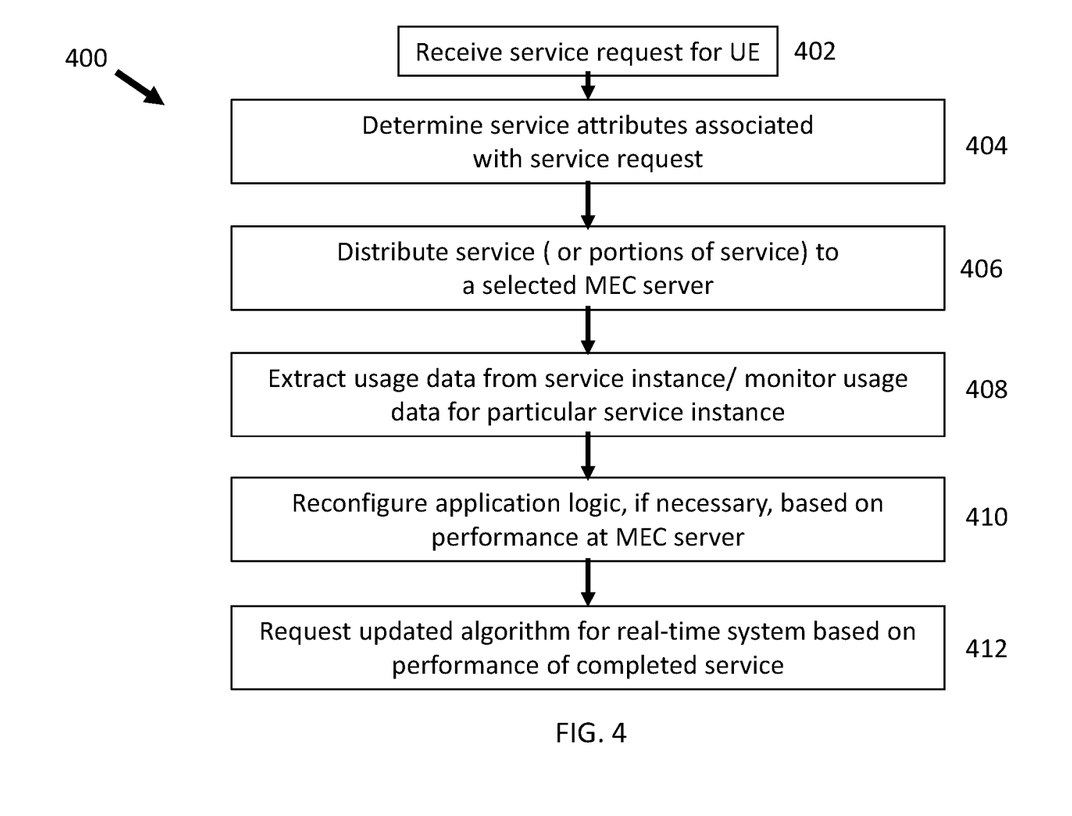
FIG. 4 is a simplified flow diagram for a process to dynamically deploy network service instances to mobile edge computing servers, according to an embodiment of the present disclosure.

FIG. 4 is a simplified flow diagram for a process to dynamically deploy network service instances to mobile edge computing servers, according to an embodiment of the present disclosure. For purposes of explanation, the process diagram is described with respect to the portions of the networked system 200 depicted in FIG. 2 and performed by the network elements shown. At step 402, the CP manager 210, receives a request from a UE to instantiate a service. Examples of service requests may include operating a specific application such as Netflix, Facebook, or virtual reality applications at the UE, among others. After receiving the request, at step 404, the CP manager 210, in conjunction with user plane equipment 218, determines the service attributes and parameters associated with the request. This may be done by parsing the service instance request into parameters that identify the user, user equipment, and application logic similar. In some embodiments, the variables identified in step 404 may be the same variables as those used to parse data stored in data storage 206, described above in FIG. 3. In other embodiments, the service attributes may only be a subset of the variables identified for organization in data storage 206.

At step 406, the CP manager 210 determines whether to distribute the service instance application logic to a MEC server. Service instance logic may be distributed entirely or partially to a MEC server for purposes of completing a requested service instance. In the case where a service is wholly distributed (e.g. fully offloaded) to MEC server 220, CP manager 210 identifies the user plane functions necessary to carry out the service and direct the application logic to the MEC server 220 associated with the user plane site 204 to which a UE is assigned. In some cases, a service may be partially distributed (e.g. partially offloaded) such that only portions of the requested service are carried out via user plane functions at the MEC server 220. For partially offloaded services, the portions of the application logic not executed at the MEC server 220 will be routed to core network 202 from the user plane site 204 through the user plane equipment 218. Core network 202 will route requested service packets to internet 100 for processing. To determine whether and which portions of a service instance to offload, CP manager 210 may employ optimized recommendations from the application recommendation module 228. Output from application recommendation module 228 may be stored in a memory associated with CP manager 210 as part of the control plane equipment 216. In some embodiments, CP manager 210 applies output from application recommendation module 228 to the network layout, such that responsibility of network resource allocation is distributed throughout the network. In some embodiments, user plane equipment 218 may also include logic that recognizes partially or fully offloaded application logic routed to MEC server 220 or to internet 100 for processing. Once CP manager 210 distributes application logic for the service instance, that network executes that service in accordance with the distributed application logic, i.e., processing for the service that is associated with the application logic distributed to the user plane is processed at the user plane, and processing for the service that is associated with the application logic at either the control plane or Internet is processed in those locations, respectively.

After or during a service instance, at step 408, control plane equipment 216 (e.g. through CP manager 210) extracts service instance performance indicators regarding the service instance and stores that as usage data. For data extracted and received at control plane equipment 216, the data may be routed to data storage 206 for later processing. In some embodiments, the usage data may be stored temporarily at memory 226 of MEC server 220. Usage data stored at memory 226 may then be periodically sent to the control plane equipment 216 (e.g., data store 206) for long-term storage. Service instance performance indicators making up the usage data received either at control plane equipment 216 or MEC server 220 may include application type; network data throughput; data use by specific applications; frequency of application use; membership tier of a user including billing terms, QoS terms, latency demands; latency requirements associated with an application; MEC function capacity, MEC function tailoring; computational demand for application functions; geographic location; compatibility of co-executed applications; time of day; energy use of the MEC server, and capacity of MEC server processor or memory, Access Point Name (APN), destination URL of the application, historic usage patterns, historic UE behavior, day of the week, date of the year, current system utilization, and a number of UE's requiring the same application in the vicinity, among others that may be correlated or identified either by operators or the machine learning algorithm itself. In some embodiments, CP manager 210 may evaluate service instance performance indicators associated with a service instance in real time.

At step 410, CP manager 210 evaluates service instance performance indicators as compared to usage data thresholds set by an operator or defined by application recommendation module 228. In some embodiments, CP manager 210 reassigns UE service instances to separate MEC servers 220 based on the comparison between service instance performance indicators and usage data thresholds. In other embodiments, CP manager 210 may reassign UE service instances to different user plane sites (not shown) contained with network 200.

For example, if a UE is travelling across a geographic region (e.g., travelling from the suburbs into a city to work) and streaming data while travelling, the associated user plane site where the UE begins its service instance may be different from the user plane site needed to process that data where the UE ends its service instance. In this case, CP manager 210 will identify the location of the UE at periodic points during the service instance and transfer the service instance application logic between user plane sites that are geographically close the UE at each point in time during the service instance. In some embodiments, using output from application recommendation module 228, CP manager 210 may identify a specific UE as consistently travelling between these geographic locations during consistent time periods. As such, CP manager 210 may anticipate shifting needs for the UE service instances and pre-determine the moment in time that the UE service instance will be off-loaded between different user plane sites in the network.

As another example, CP manager 210 may identify membership criteria (e.g., a pricing tier) associated with individual UEs for quality of service ("QoS"). When multiple UEs associated with a single user plane site are requesting service, some UEs may have their specific service instance request routed to the MEC server within that user plane site due to their premium QoS membership. In this case, a first UE may have a first level premium QoS membership while a second UE may have a second level QoS membership. If both the first UE and the second UE request a service instance of the same application (e.g. Netflix) through the same user plane equipment, the first UE may be assigned to the MEC server at the user plane site due to their premium QoS membership while the second UE may be routed to the internet 100 for processing. Alternatively, CP manager 210 may re-assign the second UE to a second user plane site for processing at the MEC server associated with the second user plane site. Reassignment to differing user plane sites may also be executed due to overall data traffic, types of applications, or other service instance performance indicators as those identified above. Re-assignment of service instances may be part of the data stored in data storage 206 and memory 226, as described above.

In some embodiments, control plane equipment (e.g., CP manager 210) may anticipate service instances for UEs and efficiently assign them to user plane sites. This reassignment may result, for example, from a UE having a higher tier QoS membership and requiring larger network capacity. In other embodiments, UEs may request the same or similar application service such that allocating application logic to a single user plane site is anticipated by control plane equipment by way of the application recommendation module. In this example, the operator may desire that the user plane site contain the application logic to avoid duplicative network resource deployment.

At step 412, CP manager 210 requests an updated algorithm for real-time system based on performance of completed service instances. In some embodiments, step 412 may occur at periodic frequencies as determined by an operator, such as known periods of data traffic (e.g., middle of the night) when network resources are in low demand. CP manager 210 may request that information from data storage 206 and memory 226 be used to update algorithm of application recommendation module 228. The stored data may include the reassignment data discussed above with respect to step 410. In this way, the algorithm may improve analytic detail by "learning" more about foreseeable network use situations and anticipate service instance needs to efficiently deploy application logic between MEC servers and user plane sites.

In some embodiments, the disclosed system for allocating application logic between user plane locations includes a processor and a memory coupled to the processor and including computer-readable instructions that, when executed by the processor, cause the processor to receive a service request from at least one user equipment and determine at least one service attributes associated with the service request. In some embodiments, the processor may further distribute at least one portion of the service to at least one distributed server node and extract service instance usage data associated with the service request. In some embodiments, the processor may transmit the service instance usage data to a data store, wherein the data store includes neural networks or machine learning algorithms. In some embodiments, the processor may also reconfigure the at least one portion of the service distributed to the at least one distributed server node.

In some embodiments, the system may further include an artificial intelligence computing system. In some embodiments, the processor may further reconfigure the at least one portion of the service is based on a performance metric at the at least one distributed server node. In some embodiments, the processor may further request an updated algorithm from an artificial intelligence computing system. In some embodiments, the distributed server node may be a virtual machine system including a controller, a processor, and a memory configured to store service instance usage data. In some embodiments, the distributed serve node may transmit the service instance usage data to the data store.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. A method comprising:
    receiving a request from a first device of a wireless network to initiate a service instance associated with a service, the service instance being associated with application logic;
    identifying a portion of the application logic to distribute to either mobile edge servers or an internet location, wherein the mobile edge servers reside in a user plane site that directly services the first device and that is separate from an Internet and the internet location;
    generating an application logic distribution from the request utilizing a machine-learning algorithm that parses the request into multiple parameters and processes the multiple parameters to indicate how to distribute portions of the application logic between the mobile edge servers and the internet location;
    determining to distribute the portion of the application logic to the mobile edge servers utilizing the application logic distribution generated by the machine-learning algorithm; and
    distributing the portion of the application logic to a first mobile edge server of the mobile edge servers to cause the first mobile edge server to provide the service instance to the first device.

2. The method of claim 1, further comprising:
    receiving, at a core wireless network via one or more user plane sites, usage data reported from the wireless network;
    providing a training data set and a calibrating data set based on the usage data; and
    training, by control plane equipment of the core wireless network, the machine-learning algorithm using the training data set.

3. The method of claim 2, further comprising training the machine-learning algorithm to identify the multiple parameters and associated weights of new usage data received from wireless devices of the wireless network, wherein multiple parameters comprise a user identifier, user equipment, and the application logic.

4. The method of claim 1, wherein the machine-learning algorithm generates and outputs application logic distributions that recommendation how to distribute user place functions between mobile edge servers and the internet location.

5. The method of claim 1, wherein the machine-learning algorithm is selected from a group consisting of K-Nearest-Neighbors, matrix factorization, and deep neural networks.

6. The method of claim 1, further comprising periodically updating the machine-learning algorithm based on performance feedback of completed services by mobile edge servers.

7. The method of claim 1, further comprising:
    receiving an additional request from a second device of the wireless network to initiate a service instance associated with the application logic;
    identifying an additional portion of the application logic to distribute to either the mobile edge servers or the internet location;
    determining to distribute the additional portion of the application logic to the internet location utilizing the machine-learning algorithm; and
    distributing the additional portion of the application logic to the internet location to cause the internet location to provide the service instance to the second device.

8. The method of claim 1, further comprising:
    identifying a predetermined time, based on historic behavior of the first device, when the portion of the application logic should be offloaded from the first mobile edge server to a second mobile edge server; and
    reassigning the portion of the application logic from the first mobile edge server to the second mobile edge server of the mobile edge servers at the predetermined time.

9. The method of claim 1, further comprising:
    extracting service instance performance indicators while the service instance is being provided to the first device, wherein the application logic distribution generated by the machine-learning algorithm comprises the service instance performance indicators; and reassigning the portion of the application logic from the first mobile edge server to a second mobile edge server of the mobile edge servers based on a comparison of the service instance performance indicators and usage data thresholds of the first mobile edge server and the second mobile edge server.

10. The method of claim 8, wherein the first mobile edge server is located at a first user plane site and the second mobile edge server is located at a second user plane site, and wherein the first user plane site is part of a core wireless network that is separate from the Internet and the internet location.

11. A system comprising:
a non-transitory memory; and
one or more hardware processors configured to read instructions from the non-transitory memory, wherein executing the instructions causes the one or more hardware processors to perform operations comprising:
  receiving a request from a first device in a wireless network to initiate a service instance associated with a service, the service instance being associated with application logic;
  identifying a portion of the application logic to distribute to either mobile edge computing (MEC) servers or an internet location, wherein the MEC servers reside in a user plane site that directly services the first device and that is separate from an Internet and the internet location;
  generating an application logic distribution from the request utilizing a machine-learning algorithm that parses the request into multiple parameters and processes the multiple parameters to indicate how to distribute portions of the application logic between the MEC servers and the internet location;
  determining to distribute the portion of the application logic to the MEC servers utilizing the application logic distribution generated by the machine-learning algorithm; and
  distributing the portion of the application logic to a first MEC server of the MEC servers to cause the first MEC server to provide the service instance to the first device.

12. The system of claim 11, further comprising additional instructions that cause the one or more hardware processors to perform operations comprising:
  receiving, at a core wireless network via one or more user plane sites, usage data reported from the wireless network;
  providing a training data set and a calibrating data set based on the usage data; and
  training, by control plane equipment of the core wireless network, the machine-learning algorithm using the training data set.

13. The system of claim 12, wherein the application logic distribution comprises new parametric connections not previously recognized in the training data set.

14. The system of claim 12, wherein training of the machine-learning algorithm occurs in accordance with an iterative process that utilizes subsets of the training data set.

15. The system of claim 11, wherein the machine-learning algorithm is selected from a group consisting of K-Nearest-Neighbors, matrix factorization, and deep neural networks.

16. The system of claim 11, further comprising periodically updating the machine-learning algorithm based on performance feedback of completed services by MEC servers.

17. A non-transitory computer readable medium storing instructions that, when executed by one or more hardware processors, cause the one or more hardware processors to carry out operations comprising:
  receiving a request from a first device of a wireless network to initiate a service instance associated with a service, the service instance being associated with application logic;
  identifying a portion of the application logic to distribute to either mobile edge servers or an internet location, wherein the mobile edge servers reside in a user plane site that directly services the first device and that is separate from an Internet and the internet location;
  generating an application logic distribution from the request utilizing a machine-learning algorithm that parses the request into multiple parameters and processes the multiple parameters to indicate how to distribute portions of the application logic between the mobile edge servers and the internet location;
  determining to distribute the portion of the application logic to the mobile edge servers utilizing the application logic distribution generated by the machine-learning algorithm; and
  distributing the portion of the application logic to a first mobile edge server of the mobile edge servers to cause the first mobile edge server to provide the service instance to the first device.

18. The non-transitory computer readable medium of claim 17, further comprising additional instructions that, when executed by the one or more hardware processors, cause the one or more hardware processors to carry out operations comprising:
  receiving an additional request from a second device of the wireless network to initiate a service instance associated with the application logic;
  identifying an additional portion of the application logic to distribute to either the mobile edge servers or the internet location;
  determining to distribute the additional portion of the application logic to the internet location utilizing the machine-learning algorithm; and
  distributing the additional portion of the application logic to the internet location to cause the internet location to provide the service instance to the second device.

19. The non-transitory computer readable medium of claim 17, further comprising additional instructions that, when executed by the one or more hardware processors, cause the one or more hardware processors to carry out operations comprising:
  identifying a predetermined time, based on historic behavior of the first device, when the portion of the application logic should be offloaded from the first mobile edge server to a second mobile edge server; and
  reassigning the portion of the application logic from the first mobile edge server to the second mobile edge server of the mobile edge servers at the predetermined time.

20. The non-transitory computer readable medium of claim 17, further comprising additional instructions that, when executed by the one or more hardware processors, cause the one or more hardware processors to carry out operations comprising:

extracting service instance performance indicators while the service instance is being provided to the first device, wherein the application logic distribution generated by the machine-learning algorithm comprises the service instance performance indicators; and
reassigning the portion of the application logic from the first mobile edge server to a second mobile edge server of the mobile edge servers based on a comparison of the service instance performance indicators and usage data thresholds of the first mobile edge server and the second mobile edge server.

* * * * *